(12) United States Patent
Billich

(10) Patent No.: US 12,270,182 B2
(45) Date of Patent: Apr. 8, 2025

(54) LOAD-CONTROLLED HYDRAULIC SUPPLY FOR A UTILITY VEHICLE

(71) Applicant: DEERE & COMPANY, Moline, IL (US)

(72) Inventor: Manuel Billich, Dornstadt (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/432,336

(22) Filed: Feb. 5, 2024

(65) Prior Publication Data
US 2024/0279906 A1 Aug. 22, 2024

(30) Foreign Application Priority Data
Feb. 22, 2023 (DE) .......................... 102023104289.0

(51) Int. Cl.
| | |
|---|---|
| *E02F 9/22* | (2006.01) |
| *E02F 3/90* | (2006.01) |
| *E02F 9/26* | (2006.01) |
| *F04B 49/06* | (2006.01) |
| *F04B 49/08* | (2006.01) |
| *F15B 11/16* | (2006.01) |
| *E02F 3/36* | (2006.01) |

(52) U.S. Cl.
CPC ............ *E02F 9/2235* (2013.01); *E02F 3/907* (2013.01); *E02F 9/264* (2013.01); *F04B 49/065* (2013.01); *F04B 49/08* (2013.01); *F15B 11/165* (2013.01); *E02F 3/3663* (2013.01); *F15B 2211/6309* (2013.01); *F15B 2211/6313* (2013.01)

(58) Field of Classification Search
CPC .................. F04B 49/065; F04B 49/08; F15B 2211/6309; F15B 2211/6313; E02F 9/2235

USPC ........................................................... 60/452
See application file for complete search history.

(56) References Cited

U.S. PATENT DOCUMENTS

| | | | | |
|---|---|---|---|---|
| 5,285,642 A * | 2/1994 | Watanabe | ............. | F15B 11/165 91/518 |
| 5,630,317 A | 5/1997 | Takamura et al. | | |
| 6,308,516 B1 * | 10/2001 | Kamada | ................. | F15B 11/167 60/452 |
| 7,905,089 B2 * | 3/2011 | Ma | ......................... | E02F 9/2235 60/452 |
| 8,037,681 B2 * | 10/2011 | Kraft | ..................... | F04B 49/065 60/452 |
| 8,468,816 B2 * | 6/2013 | Sora | ....................... | E02F 9/2091 60/452 |
| 10,408,236 B2 * | 9/2019 | Knobloch | ............. | E02F 9/2296 |

(Continued)

FOREIGN PATENT DOCUMENTS

| | | |
|---|---|---|
| DE | 102019219451 A1 | 1/2021 |
| WO | WO 2016071411 A1 | 5/2016 |

OTHER PUBLICATIONS

European Search Report issued in Application No. 24152534.4, dated May 27, 2024, 16 pages.

*Primary Examiner* — Michael Leslie

(57) ABSTRACT

A load-controlled hydraulic supply for a utility vehicle includes a variable-displacement pump supplied with hydraulic fluid from a hydraulic reservoir. The variable-displacement pump has a mechanically actuable control slide for changing a volume flow delivered. An electrical actuator is configured to actuate the control slide. A controller is configured to control the electrical actuator in accordance with a determined load requirement on a consumer side.

8 Claims, 2 Drawing Sheets

(56) References Cited

U.S. PATENT DOCUMENTS 11,377,823 B1     7/2022   Quinn et al.
11,608,615 B1 *   3/2023   Pintore ................. E02F 9/2267
11,761,464 B2 *   9/2023   Ziemens ............... F15B 11/165
                                                                           60/327

* cited by examiner

LOAD-CONTROLLED HYDRAULIC SUPPLY FOR A UTILITY VEHICLE

CROSS-REFERENCE TO RELATED APPLICATIONS

This application claims priority to German Patent Application No. 102023104289.0, filed Feb. 22, 2023, which is hereby incorporated by reference.

FIELD OF THE DISCLOSURE

The disclosure relates to a load-controlled hydraulic supply for a utility vehicle.

BACKGROUND

Utility vehicles can include a hydraulic system with one or more variable displacement hydraulic pumps. The hydraulic system can provide hydraulic flow to various components of the utility vehicle. The hydraulic system can also provide hydraulic flow to various implements attached or connected to the utility vehicle.

SUMMARY

The disclosure relates to a load-controlled hydraulic supply for a utility vehicle, for example an agricultural tractor, comprising a variable-displacement pump supplied with hydraulic fluid from a hydraulic reservoir, wherein the variable-displacement pump has a mechanically actuable control slide for changing a volume flow delivered.

The use of hydraulically operated vehicle equipment is widespread in the agricultural and forestry vehicle sector. In the case of agricultural tractors for example, there is furthermore the possibility of connecting further hydraulic consumers externally via a hydraulic interface in order to carry out agricultural work functions. In this case, a load-controlled hydraulic supply designed as a "load-sensing system" is generally provided. The load-controlled hydraulic supply typically comprises a variable-displacement pump supplied with hydraulic fluid from a hydraulic reservoir and having a load signaling connection, via which a load signaling pressure representing a load requirement of a respective hydraulic consumer can be fed in for mechanical actuation of a spring-loaded control slide. In this case, the delivery rate or volume flow delivered by the variable-displacement pump is higher, the higher the load signaling pressure applied to the load signaling connection.

In agricultural and forestry vehicles, the variable-displacement pump can be driven by means of a drive motor designed as a diesel engine, which is simultaneously a component of a travel drive of the utility vehicle. In order to optimize consumption efficiency as well as noise behavior, operation of the diesel engine in a medium speed range is predominantly desired. The variable-displacement pump can be dimensioned in such a way that its delivery capacity during operation of the diesel engine in the medium speed range is sufficient to provide a reliable supply to all hydraulic consumers, even under increased load conditions. However, this may result in the volume flow delivered by the variable-displacement pump being unnecessarily high outside this speed range and/or the diesel engine operating in a comparatively inefficient power characteristic range.

In view thereof, it is the object of the present disclosure to develop a load-controlled hydraulic supply of the type mentioned at the outset to such an extent that it allows operation of the variable-displacement pump with improved efficiency.

This object is achieved by a load-controlled hydraulic supply for a utility vehicle having the features of one or more of the following embodiments.

The load-controlled hydraulic supply for a utility vehicle, for example an agricultural tractor, comprises a variable-displacement pump fed with hydraulic fluid from a hydraulic reservoir, wherein the variable-displacement pump has a mechanically actuable control slide for changing a volume flow delivered. Furthermore, an electrical actuator or electrical actuating means for actuating the control slide is also present, wherein a control unit (e.g., a controller including a processor and memory) controls the electrical actuating means in accordance with a determined load requirement on the consumer side.

In contrast to direct mechanical actuation of the control slide by means of the load signaling pressure, the electrical actuating means in conjunction with the control unit makes it possible, with relatively little technical effort, to take into account not only a load requirement on the consumer side represented by the load signaling pressure but also further factors decisive for efficient operation of the variable-displacement pump.

The electrical actuating means can be, for example, an electromagnetic actuator, which is connected for control to a power output of the control unit, thus enabling the control slide to be deflected against a restoring spring force with a corresponding increase in the volume flow delivered. The extent of the deflection can be detected, for example, by means of a travel sensor and fed back to the control unit in order to implement a control loop.

The variable-displacement pump is usually set in rotation by a drive motor designed as a diesel engine, which is simultaneously a component of a travel drive of the utility vehicle, via a belt drive and/or an intermediate transmission, thus ensuring that the engine speed and pump speed are related to one another in accordance with a fixed transmission ratio.

Advantageous developments of the hydraulic arrangement according to the disclosure can be found in one or more of the following embodiments.

The load requirement on the consumer side can be determined by means of a pressure sensor, which is used to detect a load signaling pressure of a hydraulic consumer, which is applied to a feedback line. In this case, the sensor signal generated by the pressure sensor is converted in such a way by the control unit into a control signal suitable for actuating the electrical actuating means that the higher the load signaling pressure applied to the feedback line, the higher the volume flow delivered by the variable-displacement pump.

Furthermore, the control unit can control the electrical actuating means in respect of a targeted modification of a functional relationship existing between the volume flow delivered and the drive-side pump speed. Thus, the modification of the "operating characteristic" specific to the variable-displacement pump in question represents a particularly reliable way of taking into account not only the load requirement on the consumer side represented by the load signaling pressure but also further factors decisive for efficient operation of the variable-displacement pump.

In this respect, it is in the first instance conceivable for the modification on the part of the control unit to be carried out in such a way that the volume flow delivered by the variable-displacement pump assumes a constant value when a predetermined maximum value of the pump speed is reached, i.e. remains at least substantially unchanged even if the pump speed continues to increase beyond the predetermined maximum value. This ultimately represents a limitation on the drive power to be produced by the drive motor by capping of the delivery capacity of the variable-displacement pump, thereby making it possible to prevent the drive motor from being operated in a comparatively inefficient power characteristic range, this being especially true for a diesel engine, for example. Similar considerations apply to the dimensioning of an intermediate transmission that may be used, since this can be designed for the transmission of correspondingly lower drive torques and thus can be structurally more compact.

It can furthermore be provided that the modification on the part of the control unit is performed such that the volume flow delivered by the variable-displacement pump is adapted to maintain a predetermined power characteristic of the drive motor provided for the operation of the variable-displacement pump. In the case of a drive motor designed as a diesel engine, the volume flow delivered can be reduced, particularly in the idling speed range or a range with a comparatively low speed, to such an extent that possible stalling of the diesel engine owing to excessive loading on the part of the variable-displacement pump is prevented.

The above and other features will become apparent from the following detailed description and accompanying drawings.

BRIEF DESCRIPTION OF THE DRAWINGS

The load-controlled hydraulic supply according to the disclosure for a utility vehicle will be described in more detail below with reference to the drawings. In the drawings.

DETAILED DESCRIPTION

The embodiments or implementations disclosed in the above drawings and the following detailed description are not intended to be exhaustive or to limit the present disclosure to these embodiments or implementations.

Figure 1:
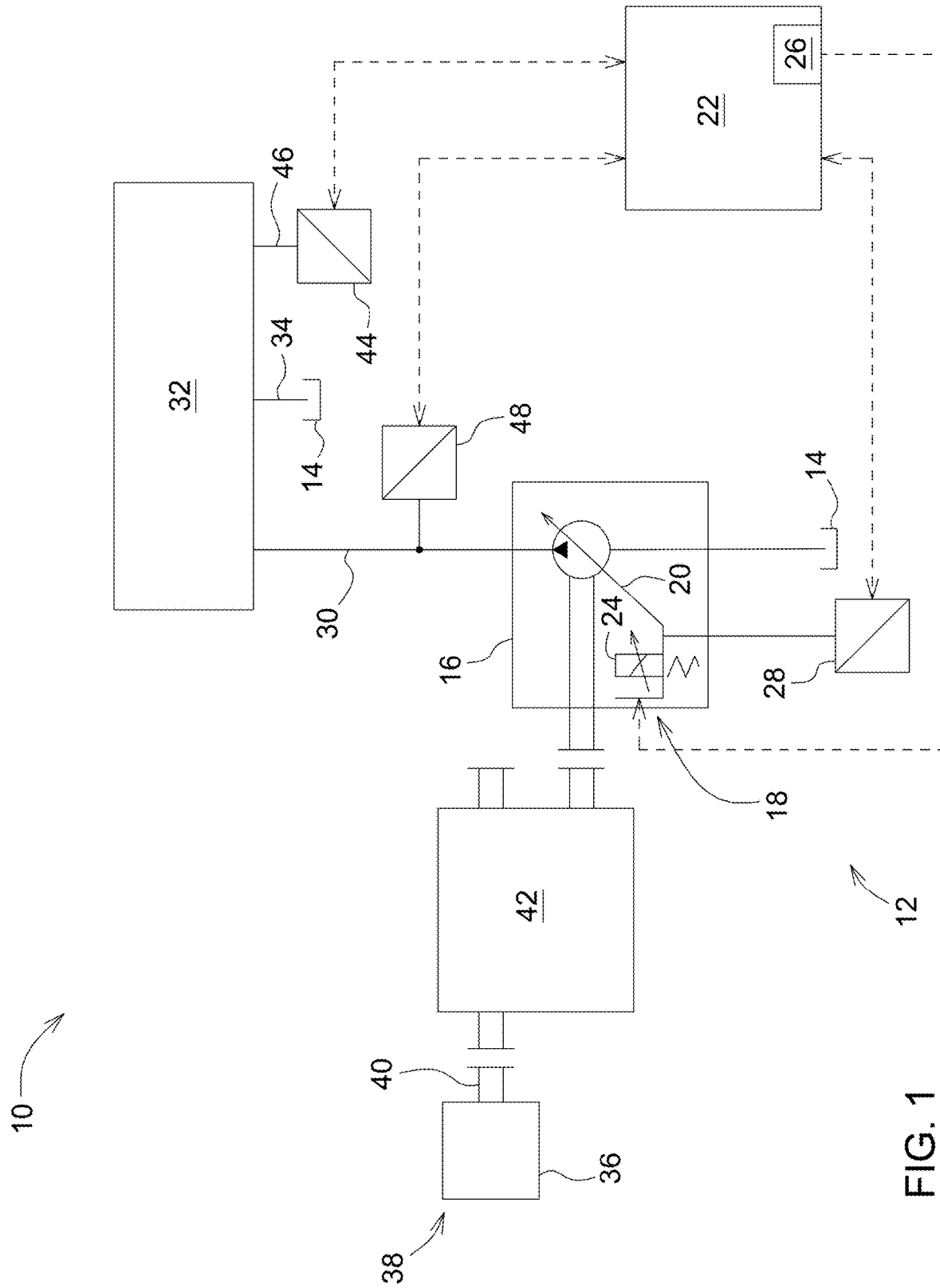
FIG. 1 shows a schematically illustrated exemplary embodiment of the load-controlled hydraulic supply according to the disclosure.

FIG. 1 shows a schematically illustrated exemplary embodiment of the load-controlled hydraulic supply according to the disclosure for a utility vehicle.

In the present case, the utility vehicle (not shown) is an agricultural tractor 10, which is equipped with a load-controlled hydraulic supply 12 designed as a "load-sensing system". The load-controlled hydraulic supply 12 comprises a variable-displacement pump 16 fed with hydraulic fluid from a hydraulic reservoir 14, which has a control slide 20 that can be actuated by means of an electrical actuator or electrical actuating means 18, wherein a control unit 22 (e.g., a controller including a processor and memory) controls the electrical actuating means 18 in accordance with a determined load requirement on the consumer side.

The electrical actuating means 18 is an electromagnetic actuator 24, which is connected for control to a power output 26 of the control unit 22, thus enabling the control slide 20 to be deflected against a restoring spring force with a corresponding increase in the volume flow $Q_{pump}$ delivered by the variable-displacement pump 16. The extent of the deflection is detected by means of a travel sensor 28 and fed back to the control unit 22 in order to implement a control loop.

For the sake of clarity, other typical components of the hydraulic supply 12, such as valve assemblies for controlling hydraulic consumers, are not shown and play no role in understanding the function of the hydraulic supply 12. Moreover, FIG. 1 shows just a single representative hydraulic consumer 32, which is operated via an associated supply line 30 and is a hydraulically operated vehicle equipment item or the like. Here, after the hydraulic power conversion, the hydraulic fluid leaves the hydraulic consumer 32 in the direction of the hydraulic reservoir 14 via a return line 34. In addition, further hydraulic consumers may be present, including those which can be connected externally via a hydraulic interface of the agricultural tractor 10 in order to carry out agricultural work functions.

According to the example, the variable-displacement pump 16 is usually set in rotation by a drive motor 38 designed as a diesel engine 36, which is simultaneously a component of a travel drive of the agricultural tractor 10, via a belt drive 40 and/or an intermediate transmission 42, thus ensuring that the engine speed $n_{eng}$ and pump speed $n_{pump}$ are related to one another in accordance with a fixed transmission ratio.

The load requirement on the consumer side is determined by means of a pressure sensor 44, which is used to detect a load signaling pressure $p_{feedbk}$ of the hydraulic consumer 32, which is applied to a feedback line 46. In this case, the sensor signal generated by the pressure sensor 44 is converted in such a way by the control unit 22 into a control signal provided for actuating the electrical actuating means 18 that the higher the load signaling pressure $p_{feedbk}$ applied to the feedback line 46, the higher the volume flow $Q_{pump}$ delivered by the variable-displacement pump 16.

A further pressure sensor 48, which communicates with the supply line 30, is used to detect the operating pressure $p_{pump}$ generated by the variable-displacement pump 16, wherein the control unit 22 throttles the delivery volume flow $Q_{pump}$ generated by the variable-displacement pump 16 by appropriate actuation of the electrical actuating means 18 if, by evaluation of the sensor signals provided by the further pressure sensor 48, the said control unit detects that the operating pressure $p_{pump}$ exceeds a permissible maximum value.

Figure 2:
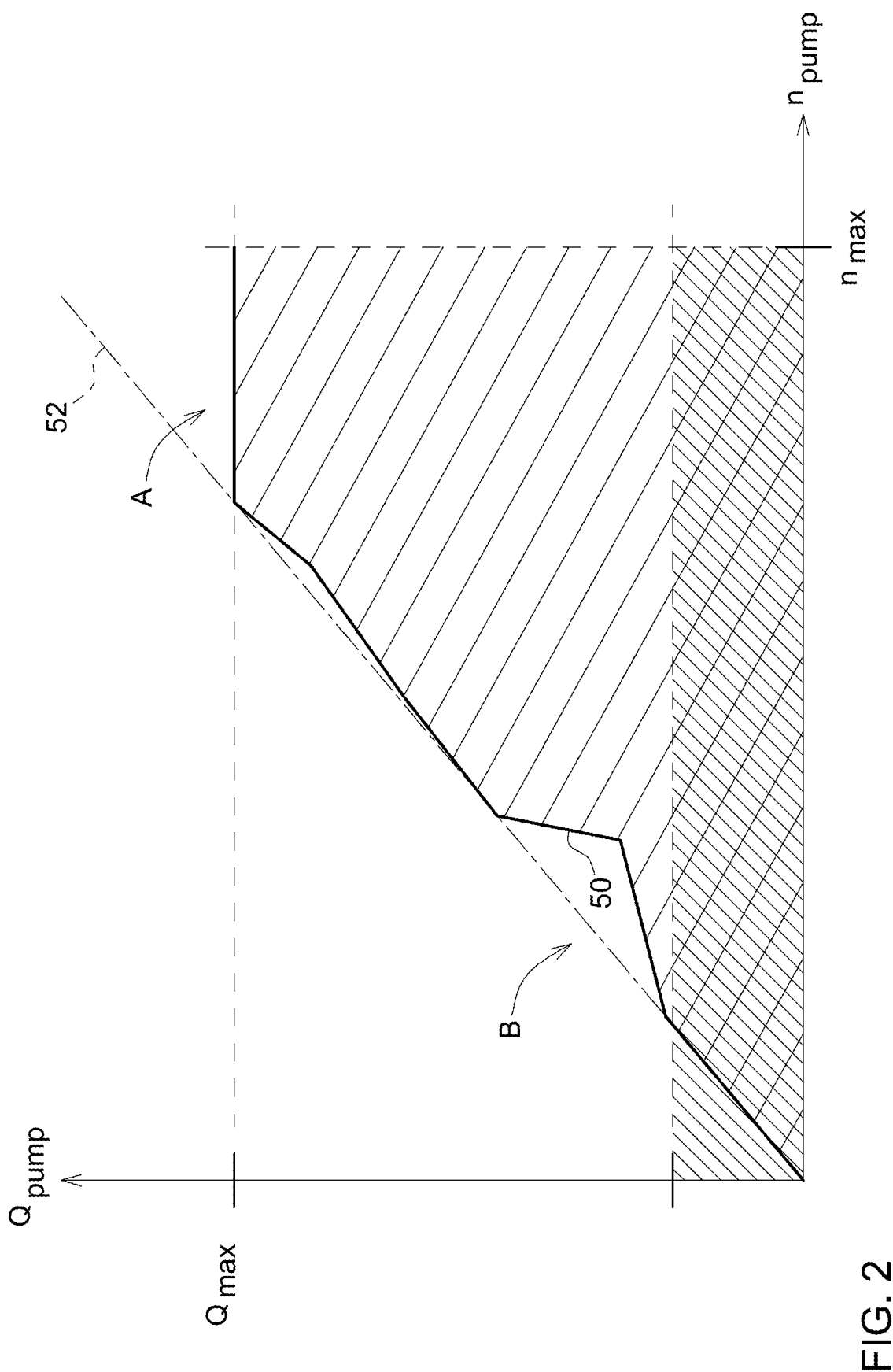
FIG. 2 shows an illustrative profile of a functional relationship existing between the volume flow delivered and the drive-side pump speed.

FIG. 2 shows a typical profile of a functional relationship 50 existing between the volume flow $Q_{pump}$ delivered and the drive-side pump speed $n_{pump}$. For comparison purposes, the dot-dash line 52 shows the profile reduced to the dependence of the volume flow $Q_{pump}$ delivered on the pump speed $n_{pump}$. This corresponds to the control behavior of a conventional variable-displacement pump, in which direct (purely) mechanical actuation of the control slide is accomplished by means of the load signaling pressure.

As a departure therefrom, it is now envisaged that the control unit 22 controls the electrical actuating means 18 in respect of a targeted modification of the functional relationship 50 existing between the volume flow $Q_{pump}$ delivered and the drive-side pump speed $n_{pump}$. The modification can take account of different operating situations.

Thus, in a first section A, the modification on the part of the control unit 22 is carried out in such a way that the volume flow $Q_{pump}$ delivered by the variable-displacement pump 16 assumes a constant value $Q_{max}$ when a predetermined maximum value $n_{max}$ of the $_{pump}$ speed $n_{pump}$ is reached. In this case, the volume flow $Q_{pump}$ delivered remains at least substantially unchanged, even if the pump speed $n_{pump}$ continues to increase beyond the predetermined maximum value $n_{max}$. This ultimately represents a limitation on the drive power to be produced by the diesel engine 36 by capping of the delivery capacity of the variable-displacement pump 16, thereby making it possible to prevent the diesel engine 36 from being operated in a comparatively inefficient power characteristic range. Similar considerations apply to the dimensioning of the intermediate transmission 42 since this can be designed for the transmission of correspondingly lower drive torques and thus can be structurally more compact.

Furthermore, in a second section B, the modification on the part of the control unit 22 is performed such that the volume flow $Q_{pump}$ delivered by the variable-displacement pump 16 is adapted to maintain a predetermined power characteristic of the diesel engine 36. In this case, the volume flow $Q_{pump}$ delivered is reduced in an idling speed range or a range with a comparatively low speed of the diesel engine 36 to such an extent that possible stalling of the diesel engine 36 owing to excessive loading on the part of the variable-displacement pump 16 is prevented.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A load-controlled hydraulic supply for a utility vehicle, comprising:
   a variable-displacement pump supplied with hydraulic fluid from a hydraulic reservoir, the variable-displacement pump having a mechanically actuatable control slide for changing a volume flow delivered;
   an electrical actuator configured to actuate the control slide; and
   a controller configured to control the electrical actuator in accordance with a determined load requirement on a consumer side;
   wherein the load requirement on the consumer side is determined via a pressure sensor, which is used to detect a load signaling pressure of a hydraulic consumer, which is applied to a feedback line;
   wherein a sensor signal generated by the pressure sensor is converted by the controller into a control signal provided for actuating the electrical actuator in such a way that the higher the load signaling pressure applied to the feedback line, the higher the volume flow delivered by the variable-displacement pump.

2. The hydraulic supply of claim 1, wherein the controller controls the electrical actuator in respect of a modification of a functional relationship existing between the volume flow delivered and a drive-side pump speed.

3. The hydraulic supply of claim 2, wherein the modification on the part of the controller is carried out in such a way that the volume flow delivered by the variable-displacement pump assumes a constant value when a predetermined maximum value of the drive-side pump speed is reached.

4. The hydraulic supply of claim 2, wherein the modification on the part of the controller is performed such that the volume flow delivered by the variable-displacement pump is adapted to maintain a predetermined power characteristic of a drive motor provided for the operation of the variable-displacement pump.

5. A utility vehicle including a load-controlled hydraulic supply, comprising:
   a variable-displacement pump supplied with hydraulic fluid from a hydraulic reservoir, the variable-displacement pump having a mechanically actuatable control slide for changing a volume flow delivered;
   an electrical actuator configured to actuate the control slide; and
   a controller configured to control the electrical actuator in accordance with a determined load requirement on a consumer side;
   wherein the load requirement on the consumer side is determined via a pressure sensor, which is used to detect a load signaling pressure of a hydraulic consumer, which is applied to a feedback line;
   wherein a sensor signal generated by the pressure sensor is converted by the controller into a control signal provided for actuating the electrical actuator in such a way that the higher the load signaling pressure applied to the feedback line, the higher the volume flow delivered by the variable-displacement pump.

6. The utility vehicle of claim 5, wherein the controller controls the electrical actuator in respect of a modification of a functional relationship existing between the volume flow delivered and a drive-side pump speed.

7. The utility vehicle of claim 6, wherein the modification on the part of the controller is carried out in such a way that the volume flow delivered by the variable-displacement pump assumes a constant value when a predetermined maximum value of the drive-side pump speed is reached.

8. The utility vehicle of claim 6, wherein the modification on the part of the controller is performed such that the volume flow delivered by the variable-displacement pump is adapted to maintain a predetermined power characteristic of a drive motor provided for the operation of the variable-displacement pump.

* * * * *